United States Patent
Bar-Ness et al.

(10) Patent No.: US 7,620,096 B2
(45) Date of Patent: Nov. 17, 2009

(54) EQUAL BER POWER CONTROL FOR UPLINK MC-CDMA WITH MMSE SUCCESSIVE INTERFERENCE CANCELLATION

(75) Inventors: Yeheskel Bar-Ness, Marlboro, NJ (US); Mizhou Tan, Whitehall, PA (US)

(73) Assignee: New Jersey Institute of Technology, Newark, NJ (US)

( * ) Notice: Subject to any disclaimer, the term of this patent is extended or adjusted under 35 U.S.C. 154(b) by 679 days.

(21) Appl. No.: 11/036,891

(22) Filed: Jan. 14, 2005

(65) Prior Publication Data

US 2005/0265291 A1 Dec. 1, 2005

Related U.S. Application Data

(60) Provisional application No. 60/574,191, filed on May 25, 2004.

(51) Int. Cl.
*H04B 1/713* (2006.01)
(52) U.S. Cl. .............. 375/144; 375/267; 375/233; 375/260; 455/450; 455/522; 455/69
(58) Field of Classification Search .............. 375/144, 375/130, 260, 267, 233, 347, 229, 206; 455/522, 455/67.13, 452, 450, 226, 69, 452.1; 370/335, 370/208
See application file for complete search history.

(56) References Cited

U.S. PATENT DOCUMENTS

| | | | | |
|---|---|---|---|---|
| 6,539,213 | B1 * | 3/2003 | Richards et al. | 455/226.3 |
| 7,076,263 | B2 * | 7/2006 | Medvedev et al. | 455/522 |
| 7,308,026 | B2 * | 12/2007 | Purho | 375/233 |
| 2001/0053143 | A1 | 12/2001 | Li et al. | |
| 2003/0215007 | A1 * | 11/2003 | Mottier | 375/229 |
| 2005/0135497 | A1 * | 6/2005 | Kim et al. | 375/267 |
| 2005/0136844 | A1 * | 6/2005 | Giesberts et al. | 455/67.13 |
| 2005/0207477 | A1 * | 9/2005 | Monsen | 375/147 |
| 2005/0249298 | A1 * | 11/2005 | Kim et al. | 375/260 |

FOREIGN PATENT DOCUMENTS

CN 1325198 12/2001

OTHER PUBLICATIONS

Mizhou Tan, Optimal Power Distribution Control under Different Total Power Constraint Strategies for Multicode MC-CDMA with Zer-forcing Successive Interference Cancellation, Mar. 21, 2004, IEEE 1376-1381.*

(Continued)

*Primary Examiner*—Shuwang Liu
*Assistant Examiner*—Eva Y Puente
(74) *Attorney, Agent, or Firm*—Connolly Bove Lodge & Hutz LLP

(57) ABSTRACT

For a given decision order, MMSE successive interference cancellation (MMSE-SIC) can simultaneously maximize SIRs of all users. To further increase its efficiency, a power control (PC) algorithm, under equal BER criterion, is disclosed for uplink MC-CDMA. In frequency-selective Rayleigh fading channels, the MMSE-SIC integrated with the equal BER PC suppresses multiple access interference (MAI) effectively, resulting in a performance very close to the single user bound (SUB).

13 Claims, 2 Drawing Sheets

OTHER PUBLICATIONS

Sridhar Gollamudi, Nonlinear MMSE Interference Cancellation for Asynchronous CDMA Channels with Convolutional Coding, 1999, IEEE 34-37.*

R.M. Buehrer, "Equal BER Performance in Linear Successive Interference Cancellation for CDMA Systems," IEEE Trans. on Communications, vol. 49, No. 7, pp. 1250-1258, Jul. 2001.

S. Hara and R. Prasad, "Overview of Multicarrier CDMA," IEEE Communications Magazine, pp. 126-133, Dec. 1997.

G. Ginis and J.M. Cioffi, "On the Relation Between V-BLAST and the GDFE," IEEE Communications Letters, vol. 5, No. 9, pp. 364-366, Sep. 2001.

T. Guess, "Optimal Sequences for CDMA with Decision Feedback Receivers," IEEE Trans. on Information Theory, vol. 49, No. 4, pp. 886-900, Apr. 2003.

G.K. Kaleh, "Channel Equalization for Block Transmission Systems," IEEE Jour. on Sel. Areas in Communications, vol. 13, No. 1, pp. 110-121, Jan. 1995.

G. Mazzini, "Equal BER with Successive Interference Cancellation DS-CDMA Systems on AWGN and Ricean Channels," Proc. ICCC PIMRC, pp. 727-731, Jul. 1995.

M. Tan and Y. Bar-Ness, "Equal BER Power Control for Uplink MC-CDMA with MMSE Successive Interference Cancellation," IEEE Communication Letters, vol. 8, No. 6, pp. 348-350, Jun. 2004.

A.J. Viterbi, "Very Low Rate Convolutional Codes for Maximum Theoretical Performance of Spread-Spectrum Multiple-Access Channels," IEEE Jour. on Sel. Areas in Communications, vol. 8, No. 4, pp. 641-649, May 1990.

Z. Wang and G. Giannakis, "Wireless Multicarrier Communications," IEEE Signal Processing Magazine, pp. 29-48, May 2000.

Chinese Office Action issued in corresponding Chinese Application No. 200580021253.6 on Dec. 5, 2008, along with the English language translation.

Andrew L. C. Hui et al.; Successive Interference Cancellation for Multiuser Asynchronous DS/CDMA Detectors in Multipath Fading Links; IEEE Transactions on Communications, vol. 46, No. 3, Mar. 1998.

* cited by examiner

EQUAL BER POWER CONTROL FOR UPLINK MC-CDMA WITH MMSE SUCCESSIVE INTERFERENCE CANCELLATION

RELATED APPLICATIONS

This application claims priority from U.S. Provisional Patent application Ser. No. 60/574,191, filed May 25, 2004.

GOVERNMENT LICENSE RIGHTS

The United States government may hold license and/or other rights in this invention as a result of financial support provided by governmental agencies in the development of aspects of the invention.

FIELD OF INVENTION

This invention relates generally to CDMA systems, and more specifically relates to a method for efficiently suppressing multiple access interferences (MAI), a major factor limiting the capacity of uplink MC-CDMA systems.

BACKGROUND OF INVENTION

The performance of CDMA systems is limited by multiple access interference (MAI). Among many interference cancellation schemes, successive interference cancellation (SIC) is highly desirable, due to its low complexity, high compatibility with existing systems and easy accommodation to strong error-correcting codes [A. J. Viterbi, "Very low rate convolutional codes for maximum theoretical performance of spread-spectrum multi-access channels," IEEE J. Select Areas Commun. Vol. 8, pp. 641-649, May 1990]. However, unlike other detection techniques, SIC is sensitive to received power allocation. By providing channel state information (CSI) at the receiver and reliable feedback of power allocation from the receiver to the transmitter, we are able to integrate SIC with power control (PC), which can improve system capacity significantly.

For a system which aims to achieve comparable performance for all users, equal BER criterion is suitable for deriving the power allocation. As has been concluded in the literature, equal BER PC benefits SIC significantly by increasing the reliability of earlier detected users. Nevertheless, most of the work focused on (match filter) SIC (MF-SIC) [Viterbi op. cit.; G. Mazzini "Equal BER with successive interference cancellation DS-CDMA systems on AWGN and Ricean channels," in Proc. ICCC PIMRC, July 1995, pp. 727-731; R. M. Buehrer, "Equal BER performance in linear successive interference cancellation for CDMA systems," IEEE Trans. Commun., vol. 49, no. 7, pp 1250-1258, Jul. 2001]. With the increase of system load, in CDMA systems, the performance of MF degrades quickly, limiting the effectiveness of SIC. Therefore, it is meaningful to integrate PC with SIC for more powerful detection techniques, such as decorrelating and MMSE. For a given decision order, MMSE SIC (MMSE-SIC) maximizes all users' SIRs simultaneously [T. Guess, "Optimal sequences for CDMA with decision-feedback receivers," IEEE Trans. Commun., vol., 49, pp. 886-900, Apr. 2003]. Therefore, in this invention we consider the equal BER PC algorithm for this optimal SIC receiver in quasi-synchronous uplink MC-CDMA.

SUMMARY OF INVENTION

For a given decision order, MMSE successive interference cancellation (MMSE-SIC) can simultaneously maximize SIRs of all users [T. Guess Op. cit.]. To further increase its efficiency, a power control (PC) algorithm, under equal BER criterion, is used in this invention for uplink MC-CDMA. In frequency-selective Rayleigh fading channels, the MMSE-SIC integrated with the equal BER PC suppresses multiple access interference (MAI) effectively, resulting in a performance very close to the single user bound (SUB). In the present invention a method is thus disclosed for efficiently suppressing multiple access interference (MAI), a major factor limiting the capacity of uplink MC-CDMA systems. A novel power control algorithm is used under equal BER criterion for a nonlinear MMSE-SIC receiver.

BRIEF DESCRIPTION OF DRAWINGS

The invention is illustrated by way of example in the drawings appended hereto in which.

DESCRIPTION OF PREFERRED EMBODIMENT

Figure 1:
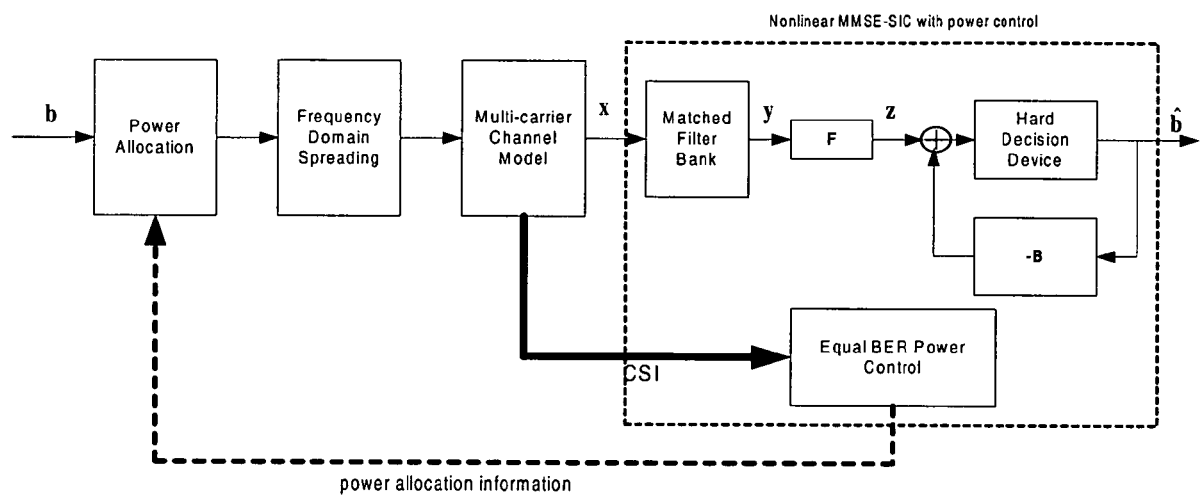
FIG. 1 is a schematic block diagram of an MC-CDMA system in accordance with the invention, with MMSE receiver integrated with the equal BER PC.

In FIG. 1 a block diagram of the MC-CDMA system with MMSE-SIC receiver integrated with the equal BER PC is schematically depicted. Referring to the Figure, the method comprises the following steps:

(a) Based on the channel state information (CSI) obtained at the receiver, the "Equal BER Power Control" block is employed to calculate the transmit power allocation of different users. A successive algorithm is used, which searches the transmit power of different users under Equal BER criterion with a total transmit power constraint (the "Multi-carrier Channel Model" represents a concatenation of IDFT, wireless fading channel and DFT).

(b) With the assumption of slow fading channel, the calculated power allocation is fed back to the transmitter so that each user will transmit with the assigned power. (b denotes a vector including transmit symbols of all users.)

(c) At the receiver, the non-linear MMSE-SIC receiver is employed. (The block diagram of FIG. 1 shows a standard operation of the non-linear MMSE-SIC receiver. The output of DFT x is first processed with a Matched-Filter Bank. Then, the output y is processed by a feedforward matrix F. After that, based on a certain decision order and output z, a "Hard Decision Device" is used to make decisions on certain transmit symbols with MMSE criterion and the earlier detected symbols $\hat{b}$ are fed back through a feedback matrix B to assist in detecting other symbols.) The equal BER power control ensures that different users achieve the same signal-to-interference (SIR) ratio after SIC, hence, significantly improving the performance of SIC and effectively suppressing MAI.

By properly defining the search district and with some well-known search algorithms, only a small number of searches are required for each channel realization. Therefore, this power control algorithm has a low complexity, particularly under a slow fading channel.

Simulation results show that the MAI can be suppressed effectively, resulting in a performance very close to the theoretical limit MMSE-SIC Receiver for MC-CDMA.

In quasi-synchronous uplink MC-CDMA, with total N sub-carriers and K active users, for the $k^{th}$ user, each transmit symbol is replicated into N copies and each copy is multiplied by a chip of a preassigned spreading code $c_k$ of length N (frequency domain spreading). After transforming by an N-point IDFT and parallel-to-serial (P/S) conversion, a cyclic prefix (CP) is inserted between successive OFDM symbols to avoid inter-symbol interference (ISI). Finally, after RF upconversion, the signal is transmitted through the channel [S. Hara and R. Prasad, "Overview of multicarrier CDMA," *IEEE Commun. Mag.*, Vol. 35, no. 12, pp. 126-133, December 1997].

A frequency-selective Rayleigh fading channel is considered. However, with the use of CP, the channel can be considered frequency-nonselective over each sub-carrier [Z. Wang and G. B. Giannakis, "Wireless multicarrier communications where Fourier meets Shannon," *IEEE Signal Processing Mag.*, pp. 29-48, May 2000]. We assume time-invariant during each OFDM symbol, hence, the channel for the $k^{th}$ user can be represented by an (N×1) vector, $h_k = [h_{k,1}, h_{k,2}, \ldots, h_{k,N}]^T$, where each element is a complex Gaussian random variable with unit variance. Furthermore, due to the proximity and partial overlap of signal spectra, correlated fading on different sub-carriers is considered. The correlation between two sub-carriers depends on their frequency spacing and the RMS channel delay spread $\tau_d$ [W. C. Jackes, Microwave Mobile Communications. New York: Wiley, 1974].

After discarding the CP, the received signal is demodulated by an N-point DFT, and the output during the $i^{th}$ OFDM symbol interval can be expressed in a compact matrix form as $$x(i) = \tilde{C}Ab(i) + \eta(i),$$

where $\tilde{C} = [h_1 \cdot c_1, h_2 \cdot c_2, \ldots, h_K \cdot c_K]$ denotes the channel-modified spreading code matrix, with $\cdot$ representing element-wise multiplication; $A = \text{diag}(a_1, a_2, \ldots, a_K)$ is a diagonal matrix containing the received amplitudes of all users and $b(i) = [b_1(i), b_2(i), \ldots, b_K(i)]^T$ containing all parallel transmitted symbols, which are assumed BPSK modulated with normalized power; The (N×1) white Gaussian noise vector $\eta(i)$ has zero mean and covariance matrix $\sigma^2 I$, where I is an (N×N) identity matrix.

After match filtering, we have $$y(i) = \tilde{C}^H x(i) = RAb(i) + \tilde{\eta}(i),$$

where $R = \tilde{C}^H \tilde{C}$ is the channel-modified cross correlation matrix. The MMSE-SIC receiver is implemented using the Cholesky factorization (CF) of the positive definite matrix $R_m = R + \sigma^2 A^{-2}$, which can be uniquely decomposed as $R_m = \Gamma^H D^2 \Gamma$, with $\Gamma$ upper triangular and monic (having all ones along the diagonal) and $D^2 = \text{diag}([d_1^2, d_2^2, \ldots, d_K^2]^T)$ having positive elements on its diagonal. Multiplying on both sides of equation (yy) by $D^{-2}\Gamma^{-H}$, we obtain $$z(i) = D^{-2}\Gamma^{-H} y(i) = \Gamma Ab(i) + \hat{\eta}(i),$$

where $\hat{\eta}(i)$ is a (K×1) vector with uncorrelated components, (Note that the extra term $-D^{-2}\Gamma^{-H}\sigma^2 A^{-1}b(i)$ was included into $\hat{\eta}(i)$.) whose covariance matrix $R_{\hat{\eta}(i)} = \sigma^2 D^{-2}$ [G. Ginis and J. Cioffi, "On the relationship between V-BLAST and the GDFE," *IEEE Commun. Lett.*, vol. 5, pp. 364-366, September 2001]. Since $\Gamma$ is upper triangular and $\hat{\eta}(i)$ has uncorrelated components, $b(i)$ can be recovered by back-substitution combined with symbol-by-symbol detection. The detection algorithm is as follows, for $k = 0$ to $K - 1$ $$\hat{b}_{K-k}(i) = \text{hard decision}\left( (z_{K-k}(i)) - \sum_{m=1}^{k} a_{K-k+m} \cdot \Gamma_{K-k, K-k+m} \hat{b}_{K-k+m}(i) \right)$$

By ignoring decision errors (It is pointed out in [Guess op. cit.] that in uncoded systems, the effects of error propagation can for the most part be mitigated, when the users are detected in decreasing order of SIR) the SIR of the $(k+1)^{th}$ detected symbol $\hat{b}_{K-k}(i)$ can be expressed as [G. K. Kaleh, "Channel equalization for block transmission systems," *IEEE J. Select Areas Commun.*, vol. 13, pp. 110-121, January 1995]:

$$SIR_{K-k} = \frac{E[|a_{K-k} b_{K-k}(i)|^2]}{mmse} - 1 = \frac{a_{K-k}^2}{\sigma^2 d_{K-k}^{-2}} - 1.$$

Moreover, when all interferences are cancelled, the last detected symbol $\hat{b}_1(i)$ achieves the single user bound (SUB), given by $$BER_{SUB} = E_H\left[ Q\left( \sqrt{\frac{a_1^2 \cdot \left(\frac{1}{N}\sum_{n=1}^{N} |h|_{1,n}^2\right)}{\sigma^2}} \right) \right],$$

where $E_H[\cdot]$ denotes the expectation over all channel realizations and $Q(\cdot)$ represents the tail of the error function.

Equal BER PC Algorithm

From (snr), to achieve the same BER, for all users, we need $$a_K^2 d_K^2 = a_{K-1}^2 d_{K-1}^2 = \ldots = a_1^2 d_1^2.$$

Expressing $R_m = R + \sigma^2 A^{-2}$ and its CF, $R_m = \Gamma^H D^2 \Gamma$ in details, we get the following two equal matrices, $$\begin{bmatrix} r_{1,1} + \sigma^2 a_1^{-2} & r_{1,2} & \ldots & r_{1,K} \\ r_{2,1} & r_{2,2} + \sigma^2 a_2^{-2} & \ldots & r_{2,k} \\ \vdots & \vdots & \ddots & \vdots \\ r_{K,1} & r_{K,2} & \ldots & r_{K,K} + \sigma^2 a_K^{-2} \end{bmatrix} \text{ and }$$

$$\begin{bmatrix} d_1^2 & d_1^2 \gamma_{1,2} & \ldots & d_1^2 \gamma_{1,K} \\ d_1^2 \gamma_{1,2}^* & \sum_{k=1}^{2} d_k^2 |\gamma_{k,2}|^2 & \ldots & \sum_{k=1}^{2} d_k^2 \gamma_{k,K} \gamma_{k,2} \\ \vdots & \vdots & \ddots & \vdots \\ d_1^2 \gamma_{1,K}^* & \sum_{k=1}^{2} d_k^2 \gamma_{k,K}^* \gamma_{k,2} & \ldots & \sum_{k=1}^{K} d_k^2 |\gamma_{k,K}|^2 \end{bmatrix},$$

where * denotes complex conjugate, $r_{ij}$ and $\gamma_{ij}$ denote the $(i,j)^{th}$ element of R and $\Gamma$, respectively. Notice $\gamma_{ij}=1$ when i=j. Since $R_m$ is Hermitian symmetric, we only consider the lower triangle. Defining $a_k^2 d_k^2 \triangleq \lambda$, then (snr) becomes $$SIR_k = \frac{\lambda}{\sigma^2} - 1$$

(k=1, 2, ..., K), which greater than zero for $\lambda > \sigma^2$. By equating the first column of (m1) and (m2), we obtain the following K equations $$\begin{cases} r_{1,1} + \sigma^2 a_1^{-2} = d_1^2 \\ r_{2,1} = d_1^2 \gamma_{1,2}^* \\ \vdots \\ r_{K,1} = d_1^2 \gamma_{1,K}^* \end{cases}$$

Substituting $$d_1^2 = \frac{\lambda}{a_1^2}$$

into the first equation of (e1), we get $$a_1^2 = \frac{\lambda - \sigma^2}{r_{1,1}} \text{ and } d_1^2 = \frac{\lambda r_{1,1}}{\lambda - \sigma^2}.$$

Applying $d_1^2$ in the rest equations, we obtain $$\gamma_{1,k} = \frac{r_{k,1}^*}{d_1^2}$$

(k=2, 3, ..., K). Similarly, from the K−1 equations of the second column, we get $$a_2^2 = \frac{\lambda - \sigma^2}{r_{2,2} - |\gamma_{1,2}|^2 d_1^2}.$$

With $$d_2^2 = \frac{\lambda}{a_2^2}$$

and the results obtained from the first column, $\gamma_{2,k}$ (k=3, 4, ..., K) can be solved. Applying the same method successively for the rest columns, finally, we obtain the power allocation $a_k^2$, which can be expressed in the general successive form as $$\begin{cases} a_1^2 = \frac{\lambda - \sigma^2}{r_{1,1}} \\ a_k^2 = \frac{\lambda - \sigma^2}{r_{k,k} - \sum_{j=1}^{k-1} |\gamma_{j,k}|^2 a_j^{-2} \lambda} (k=2, \ldots, K). \end{cases}$$

From (result), $a_k^2$ (k=1, 2, ..., K) is a function of $\lambda$, is which was proven in Appendix A to satisfy the following property: $a_k^2 \in [0, +\infty)$ (k=1, 2, ..., K) are monotonically increasing with $\lambda \in [\sigma^2, +\infty)$. With the above conclusion, under a power constraint $\rho \in [0, +\infty)$, there uniquely exists a $(\lambda)^\dagger$, and with (result), a unique power distribution $(a_k^2)^\dagger$, which satisfies $$\mathcal{P} = \frac{1}{K} \sum_{k=1}^{K} (a_k^2)^\dagger.$$

In conclusion, the algorithm can be described as follows: 1) let $\lambda = \sigma^2$ 2) applying (result), calculate $$\frac{1}{K} \sum_{k=1}^{K} a_k^2.$$

3) compare the result with $\rho$, if smaller, increase $\lambda$ and go back to step 2) until finally $$\mathcal{P} = \frac{1}{K} \sum_{k=1}^{K} a_k^2$$

with predefined accuracy By properly defining the range of $\lambda$ and with some well-known search algorithms, the number of searches can be reduced significantly. A modified CF algorithm might possibly be needed if the channel changes very fast. Since decision errors were ignored, the actually achieved SIR will be lower than the expected, which equals $$\frac{(\lambda)^\dagger}{\sigma^2} - 1.$$

Therefore, the following expression is a BER lower bound (LB) for MMSE-SIC receiver with the equal BER PC $$BER_{LB} = E_H \left[ Q\left( \sqrt{\frac{(\lambda)^\dagger}{2} - 1} \right) \right].$$

Simulation Results and Discussions

An indoor Rayleigh fading channel model is employed for simulations, with 100 MHz total bandwidth and $\tau_d = 25$ ns. The sub-carrier number N is chosen to be 16. Orthogonal Walsh Hadamard codes are employed for spreading. For each user, the instantaneous channel is randomly chosen from an ensemble consisted of 1000 i.i.d. Rayleigh fading channels (assumed unchanged for 100 symbols).

Figure 2:
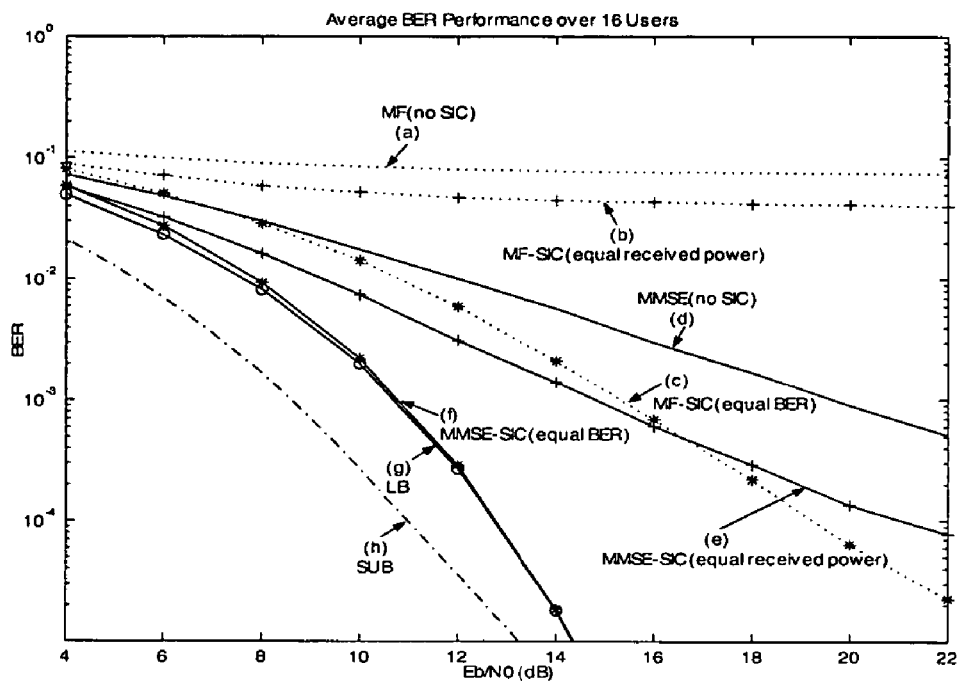
FIG. 2 is a graph of BER performance, with different receiver structures, with and without PC, over 16 users versus the average $E_b/N_0$ per user.

To emphasize the performance improvement with the proposed scheme, we compare in FIG. 2 the average BER performance, with different receiver structures, with and without PC, over 16 users versus the average $E_b/N_0$ per user. From this figure, we can see that the performance of MF (no SIC) ((a)) and MF-SIC with equal received power ((b)) are heavily limited by MAI, while MMSE (no SIC) ((d)) handles MAI much better than MF ((a) or (b)). Even with equal received power, employing SIC to MMSE ((e)) results in a significant performance improvement. Nevertheless, at a BER of $10^{-4}$, it is about 10 dB worse than the SUB ((h), equation (6)). Integrating MMSE-SIC with the proposed equal BER PC ((f)), additional 8 dB improvement can be obtained at a BER of $10^{-4}$, which is only less than 2 dB worse than the SUB, and it significantly outperforms MF-SIC with the equal BER PC ((c)). Moreover, it is interesting to note that the performance difference between the simulation result with MMSE-SIC with the equal BER PC ((f)) and the LB ((g), equation (13)) is very small, especially at high $E_b/N_0$, which justifies the assumption of ignoring decision errors.

Figure 3:
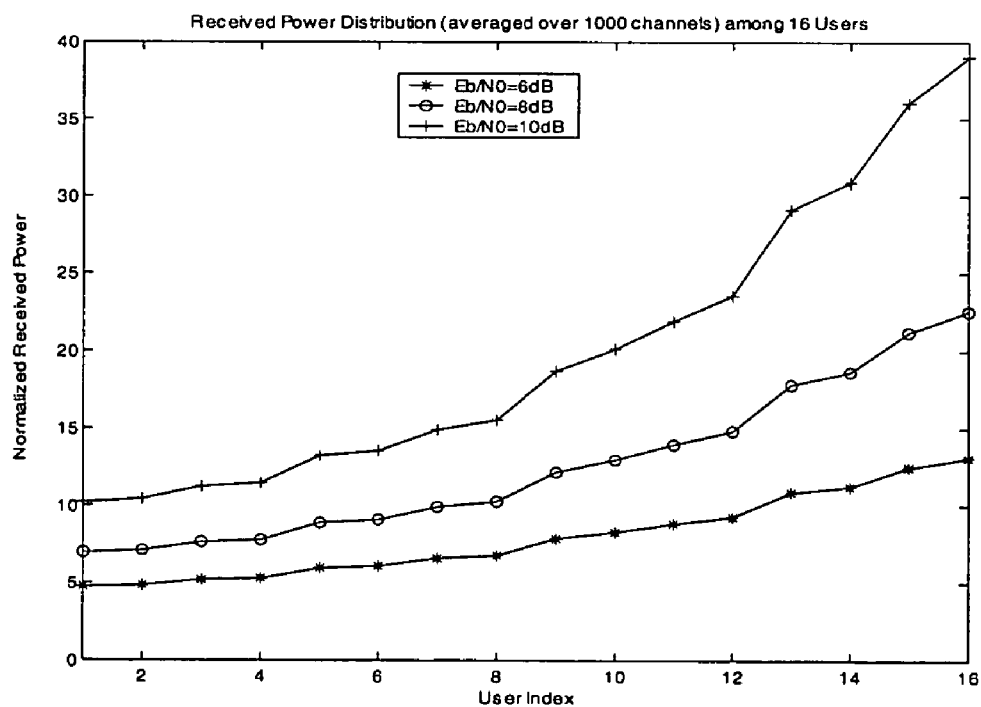
FIG. 3 is a graph of BER performance, with different receiver structures, with and without PC, over 16 users versus the average $E_b/N_0$ per user.

FIG. 3 shows the received power allocation (averaged over 1000 channels, $\sigma^2=1$) on 16 successive detected users. Not surprisingly, under different $E_b/N_0$, earlier detected users (larger index) are always allocated more power than the later detected ones (smaller index).

Under equal BER criterion, the PC algorithm disclosed for the MMSE-SIC receiver and its performance is thus analyzed and compared with other receiver strategies with and without PC in frequency-selective Rayleigh fading channels. From the results, we conclude that MMSE-SIC integrated with the equal BER PC is a powerful solution for suppressing MAI in uplink MC-CDMA systems.

Appendix A

Proof of Property that: $a_k^2 \in [0, +\infty)$ (k=1, 2, ..., K) are monotonically increasing with $\lambda \in [\sigma^2, +\infty)$ Proof: Clearly, when $\lambda=\sigma^2$, $a_k^2=0$ (k=1, 2, ..., K). When ignoring decision errors, the $k^{th}$ detected symbol is only interfered by those haven't been detected ($(k+1)^{th}$, $(k+2)^{th}$, ..., $K^{th}$) and its SIR can be expressed alternatively as $SIR_{K-k+1}=a_{K-k+1}^2 \tilde{C}_{K-k+1}^H S_{K-k+1}^{-1} \tilde{C}_{K-k+1}$, where $$S_{K-k+1} = \sum_{j<k} \tilde{C}_{K-j+1} a_{K-j+1}^2 \tilde{C}_{K-j+1}^H + \sigma_n^2 I$$

and $X_k$ denotes the $k^{th}$ column of matrix X. For the last ($K^{th}$) detected symbol, since all interference has been perfectly cancelled, $$SIR_1 = \frac{\lambda}{\sigma^2} - 1 = \frac{a_1^2 \tilde{C}_1^H \tilde{C}_1}{\sigma^2}.$$

Clearly, $a_1^2$ is monotonically increasing with $\lambda$. In another word, with $\lambda_1 > \lambda_2$, $a_{1|\lambda_1}^2 > a_{1|\lambda_2}^2$. For the second last (($K-1)^{th}$) detected symbol, $$SIR_2 = \frac{\lambda}{\sigma^2} - 1 = a_2^2 \tilde{C}_2^H S_2^{-1} \tilde{C}_2,$$

where $S_2 = \tilde{C}_1 a_1^2 \tilde{C}_1^H + \sigma^2 I$. When $\lambda_1 > \lambda_2$, $a_{1|\lambda_1}^2 > a_{1|\lambda_2}^2$, hence, $S_{2|\lambda_1} - S_{2|\lambda_2}$ is positive definite, which means $S_{2|\lambda_1} > S_{2|\lambda_2}$. Obviously, $(S_{2|\lambda_1})^{-1} < (S_{2|\lambda_2})^{-1}$, thus, $\tilde{C}_2^H((S_{2|\lambda_1})^{-1} - (S_{2|\lambda_2})^{-1})\tilde{C}_2 < 0$. If $$a_{2|\lambda_1}^2 \leq a_{2|\lambda_2}^2, \frac{\lambda_1}{\sigma^2} - 1 \leq \frac{\lambda_2}{\sigma^2} - 1,$$

which conflicts with $\lambda_1 > \lambda_2$. Therefore, to achieve a higher SIR (larger $\lambda$), $a_2^2$ must be increased to compensate for higher interference, which means, $a_2^2$ is also monotonically increasing with $\lambda$. Similar analysis can be made successively for the other symbols.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method for efficiently suppressing multiple access interference (MAI) in an uplink multi-carrier code-division multiple-access (MC-CDMA) system, comprising:
   integrating a nonlinear minimum mean-square error-successive interference cancellation (MMSE-SIC) receiver in said system with an equal bit-error rate (BER) power control (BER PC) to control transmit power of multiple users on the uplink,
   wherein, based on channel state information (CSI) obtained at the receiver, transmit power allocations of said multiple users are calculated by use of a successive algorithm that searches the transmit power of said multiple users under an equal BER criterion with a total transmit power constraint.

2. A method in accordance with claim 1, wherein said system considers slow fading channels and a given decision order, for which the nonlinear MMSE-SIC receiver maximizes said multiple users' signal-to-interference ratios (SIRs) simultaneously.

3. A method in accordance with claim 1, wherein at least one calculated power allocation is fed back to a transmitter so that a user of said transmitter will transmit with an assigned power.

4. A method in accordance with claim 1, wherein the power allocation of a $k^{th}$ user, $a_k^2$, is expressed in general successive form as $$\begin{cases} a_1^2 = \dfrac{\lambda - \sigma^2}{r_{1,1}} \\ a_k^2 = \dfrac{\lambda - \sigma^2}{r_{k,k} - \sum_{j=1}^{k-1} |\gamma_{j,k}|^2 a_j^{-2} \lambda} (k=2, \ldots, K) \end{cases}, \quad \text{Equation (A)}$$

where K is the number of active users; where $\sigma^2$ denotes the noise variance; $r_{i,j}$ denotes the $(i,j)^{th}$ element of R, where R is the channel-modified cross correlation matrix; $Y_{ij}$ denotes the $(ij)^{th}$ element of r, which is obtained from the Cholesky factorization (CF) of the positive definite matrix $R_m=R+\sigma^2 A^{-2}$, where $A = \text{diag}(a_1, a_2, \ldots, a_K)$ is a diagonal matrix containing the received amplitudes of all users; the said CF enabling $R_m$ to be uniquely decomposed to be $R_m = \Gamma^H D^2 \Gamma$, where $\Gamma$ is upper triangular and monic and $D^2$ is diagonal with all positive elements, $D^2 = \text{diag}([d_1^2, d_2^2, \ldots, d_<^2]^T)$; and wherein the algorithm is implemented by the steps of 1) letting $\lambda = \sigma^2$; 2) applying Equation (A) to calculate $1/K \Sigma_{k=1}^{K} a_k^2$.; 3) comparing the result with the power constraint P, and if smaller, increasing $\lambda$ and going back to step 2) until finally $P = 1/K \Sigma_{k=1}^{K} a_k^2$ with predetermined accuracy.

5. A method of suppressing multiple access interference (MAI) in an uplink multi-carrier code-division multiple-access (MC-CDMA) communication system, the method comprising:

demodulating a received MC-CDMA signal using non-linear minimum mean-square error/successive interference cancellation reception (MMSE-SIC); and determining transmit power allocations for multiple uplink transmitters based on an equal bit-error rate (BER) power control scheme, wherein said equal BER power control scheme utilizes channel state information obtained from the received MC-CDMA signal, and wherein said determining comprises:

using an iterative algorithm to search transmit powers of the multiple uplink transmitters according to an equal BER criterion with a total transmit power constraint.

6. The method according to claim 5, wherein said demodulating comprises:

simultaneously maximizing signal-to-interference ratios corresponding to signals received from the multiple uplink transmitters.

7. The method according to claim 5, wherein said iterative algorithm comprises:

(a) letting $\lambda = \sigma^2$;

(b) applying Equation (A) to calculate $$\frac{1}{K} \sum_{k=1}^{K} a_k^2 ;$$

(c) comparing the result obtained in (b) with the power constraint P, and if smaller, increasing $\lambda$ and going back to step (b) until finally $$\overline{P} = \frac{1}{K} \sum_{k=1}^{K} a_k^2$$

with predetermined accuracy, wherein $a_k^2$ represents the transmit power allocation of the $k^{th}$ uplink transmitter and Equation (A) is defined as follows:

$$\begin{cases} a_1^2 = \dfrac{\lambda - \sigma^2}{r_{1,1}} \\ a_k^2 = \dfrac{\lambda - \sigma^2}{r_{k,k} - \sum\limits_{j=1}^{k-1} |\gamma j, k|^2 a_j^{-2} \lambda} (k = 2, \ldots, K) \end{cases} \quad \text{Equation (A)}$$

where K is the number of active uplink transmitters; $\sigma^2$ denotes noise variance; $r_{i,j}$ denotes the $(i,j)^{th}$ element of R, where R is the channel-modified cross-correlation matrix; $\gamma ij$ denotes the $(i,j)^{th}$ element of r, which is obtained from the Cholesky factorization (CF) of the positive definite matrix $R_m = R + \sigma^2 A^{-2}$, where $A = \text{diag}(a_1, a_2, \ldots a_K)$ is a diagonal matrix containing the received amplitudes of the signals corresponding to the K active transmitters; the CF enabling $R_m$ to be uniquely decomposed to be $R_m = \Gamma^H D^2 \Gamma$, where $\Gamma$ is upper triangular and monic and $D^2$ is diagonal with all positive elements, $D^2 = \text{diag}([d_1^2, d_2^2, \ldots, d_<^2]^T)$.

8. The method according to claim 5, further comprising: feeding back the transmit power allocations to the multiple uplink transmitters.

9. A receiver for a multi-carrier code-division multiple-access (MC-CDMA) signal, the receiver comprising:

a non-linear minimum mean-square error/successive interference cancellation (MMSE-SIC) module to extract data from a received MC-CDMA signal; and an equal bit-error rate (BER) power control calculator to calculate transmit power allocations for multiple transmitters transmitting component signals of the received MC-CDMA signal, wherein the equal BER power control calculator is further to utilize channel state information obtained based on the received MC-CDMA signal, and wherein said equal BER power control calculator is to use an iterative algorithm to search transmit powers of the multiple transmitters according to an equal BER criterion with a total transmit power constraint.

10. The receiver according to claim 9, wherein said iterative algorithm comprises:

(a) letting $\lambda = \sigma^2$;

(b) applying Equation (A) to calculate $1/K \Sigma_{k=1}^{K} a_k^2$.;

(c) comparing the result obtained in (b) with the power constraint P, and if smaller, increasing $\lambda$ and going back to step (b) until finally $P = 1/K \Sigma_{k=1}^{K} a_k^2$ with predetermined accuracy, wherein $a_k^2$ represents the transmit power allocation of the $k^{th}$ transmitter and Equation (A) is defined as follows:

$$\begin{cases} a_1^2 = \dfrac{\lambda - \sigma^2}{r_{1,1}} \\ a_k^2 = \dfrac{\lambda - \sigma^2}{r_{k,k} - \sum\limits_{j=1}^{k-1} |\gamma j, k|^2 a_j^{-2} \lambda} (k = 2, \ldots, K) \end{cases} \quad \text{Equation (A)}$$

where K is the number of active transmitters; $\sigma^2$ denotes noise variance; $r_{i,j}$ denotes the $(i,j)^{th}$ element of R, where R is the channel-modified cross-correlation matrix; $\gamma ij$ denotes the $(i,j)^{th}$ element of r, which is obtained from the Cholesky factorization (CF) of the positive definite matrix $R_m = R + \sigma^2 A^{-2}$, where $A = \text{diag}(a_1, a_2, \ldots, a_K)$ is a diagonal matrix containing the received amplitudes of the signals corresponding to the K active transmitters;

the CF enabling $R_m$ to be uniquely decomposed to be $R_m = \Gamma^H D^2 \Gamma$, where $\Gamma$ is upper triangular and monic $D^2$ is diagonal with all positive elements, $D^2 = \text{diag}([d_1^2, d_2^2, \ldots, d_<^2]^T)$.

11. The receiver according to claim 9, further comprising:
a feedback channel to provide the transmit power allocations to the transmitters.

12. The receiver according to claim 9, wherein said MMSE-SIC module comprises:
a matched filter bank to process the received MC-CDMA signal to obtain a processed received signal vector;
a feed-forward matrix multiplier to multiply the processed received signal vector by a feed-forward matrix to obtain a further signal vector; and
a decision block to process the further signal vector to obtain an output data vector.

13. The receiver according to claim 12, wherein the decision block comprises:
a summation device to receive the further signal vector;
an MMSE decision device to provide said output data vector; and
a feedback path to multiply the output data vector by a feedback matrix and to provide the result to said summation device.

\* \* \* \* \*

UNITED STATES PATENT AND TRADEMARK OFFICE
CERTIFICATE OF CORRECTION

PATENT NO. : 7,620,096 B2
APPLICATION NO. : 11/036891
DATED : November 17, 2009
INVENTOR(S) : Bar-Ness et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Twenty-sixth Day of October, 2010

David J. Kappos
*Director of the United States Patent and Trademark Office*